United States Patent [19]

Brown et al.

[11] Patent Number: 4,492,744

[45] Date of Patent: Jan. 8, 1985

[54] SECONDARY ZINC ELECTRODE FOR A SECONDARY ELECTRO-CHEMICAL CELL

[75] Inventors: David J. Brown, Solihull; Trevor L. Markin, Reading; Ronald M. Dell, Abingdon, all of England

[73] Assignee: Lucas Industries, Birmingham, England

[21] Appl. No.: 479,802

[22] Filed: Mar. 28, 1983

[30] Foreign Application Priority Data

Apr. 6, 1982 [GB] United Kingdom ............... 8210161

[51] Int. Cl.³ ............................................. H01M 4/76
[52] U.S. Cl. .................... 429/217; 429/229; 429/234
[58] Field of Search ............... 429/229, 234, 217

[56] References Cited

U.S. PATENT DOCUMENTS

| | | | |
|---|---|---|---|
| 3,016,413 | 1/1962 | Pasquale et al. | 136/45 |
| 3,873,367 | 3/1975 | Kandler | 429/229 |
| 3,918,990 | 11/1975 | Enters | 136/30 |
| 4,197,635 | 4/1980 | Bilhorn | 429/229 |
| 4,407,915 | 10/1983 | Brown | 429/229 |

FOREIGN PATENT DOCUMENTS

| | | |
|---|---|---|
| 0102636 | 4/1899 | Fed. Rep. of Germany . |
| 0199290 | 9/1906 | Fed. Rep. of Germany . |
| 2255938 | 11/1972 | Fed. Rep. of Germany . |
| 56-69772 | 6/1981 | Japan .................... 429/229 |
| 1266045 | 3/1972 | United Kingdom . |

*Primary Examiner*—Donald L. Walton
*Attorney, Agent, or Firm*—Holman & Stern

[57] ABSTRACT

A secondary zinc electrode, for example, for a nickel/zinc cell has an electrically conductive support onto each major surface of which is pressed an active zinc material. A grid structure defining a plurality of compartments is pressed into the material on each major surface of the support so as to separate the active material into a plurality of physically separate areas. Such an arrangement mitigates the shape change problem to which secondary zinc electrodes are prone in service.

9 Claims, 5 Drawing Figures

SECONDARY ZINC ELECTRODE FOR A SECONDARY ELECTRO-CHEMICAL CELL

This invention relates to a secondary zinc electrode for a secondary electro-chemical cell for example, a nickel/zinc, silver/zinc, manganese dioxide/zinc or zinc/air secondary cell, and to a method of manufacturing such an electrode.

Secondary zinc electrodes offer significant advantages over other negative electrodes used in secondary alkaline electro-chemical cells, such advantages including excellent capacity, high electro-chemical potential and low weight when combined with a suitable positive electrode.

However, secondary zinc electrodes suffer from a tendency for the zinc to migrate from the periphery of the electrode to the centre and also to the bottom of the electrode. This phenomenon, which is generally referred to as "shape change", leads to the edges of the electrode becoming inactive and also reduces the activity of the centre and the bottom of the electrode by causing the density of the zinc at the centre and at the bottom of the electrode to increase. This results in uneven stresses between such an electrode and its adjacent positive electrode which contribute to a shortening of the effective life of the cell.

European Patent application Publication No. 0021735 discloses a way of reducing the shape change problem by providing a pressed, secondary zinc electrode having dispersed therein particulate carbon in an amount between 1 and 50% by weight of the total weight of zinc and carbon, and an organic binder in an amount between 0.5 and 10% by weight of the total weight of zinc and carbon. Whilst such a zinc electrode is markedly superior to zinc electrodes containing no particulate carbon, there is still a requirement to provide a secondary zinc electrode which is even less prone to shape change. This requirement arises largely because of the requirement for a cycle life of at least 800 cycles for large cells, in order to make nickel/zinc batteries commercially feasible for electric vehicles and other similar applications.

As an alternative to the use of carbon as described above, it has also been proposed to use other fillers to modify the performance of the electrode or to use special binders such as polytetrafluoroethylene or electrochemically active additives, often in binary form such as lead and cadmium. However, even when a combination of these techniques is employed, it has not yet been possible to reach the 800 cycle life requirement of the nickel/zinc battery system for large cells at 80% depth of discharge.

It is an object of the present invention to provide a further technique for mitigating shape change problems in secondary zinc electrodes.

According to the present invention, there is provided a secondary zinc electrode for a secondary electro-chemical cell, comprising an electrically conductive support, a pressed active material adhering to at least one major surface of the support and presenting an outer face which is spaced outwardly of said major surface, characterised in that a grid structure separates the active material on the support into a plurality of physically separate areas.

Whilst all of the separate areas of the active material are in electrical contact with the electrically conductive support, the provision of the grid structure between such separate areas materially improves the resistance of the electrode to shape change. Although it is preferred for the teachings of the present invention to be used in conjunction with any one or more of the above mentioned techniques for mitigating the shape change problem, it is within the scope of the invention to provide an electrode in which the only technique employed for mitigating the shape change problem is that of the present invention, namely the use of the aforesaid grid structure. Thus, the zinc electrode preferably has dispersed therein particulate carbon, e.g. graphite, in an amount of 1 to 50% (more preferably 20 to 50%) by weight of the combined weight of zinc and carbon, and an organic binder, e.g. polytetrafluoroethylene, in an amount of 0.5 to 10% by weight of the combined weight of zinc and carbon. The specified percentages of carbon and organic binder are based on the total weight of zinc and carbon in the electrode. However, it is to be appreciated that the weight of zinc in this combined weight is the weight of metallic zinc even though the zinc may be present as zinc oxide or a zinc hydroxide. In this respect, it is to be understood that, during discharge of a secondary zinc electrode, zinc is converted to zinc oxide, $Zn(OH)_2$ and/or $Zn(OH)_4^{2-}$, whereas during charging, the zinc oxide and any hydroxide species are converted back to metallic zinc. Thus, when the electrode is initially produced, the zinc will normally be present as an oxide or hydroxide.

A typical example of a secondary cell is the nickel/zinc cell. In such cells, secondary pressed-type nickel electrodes containing graphite have a tendency to swell during service; this tendency is exacerbated by using high (5-8%) levels of cobalt which might otherwise be used to improve the positive electrode utilisation and general performance. When cobalt-containing pressed nickel electrodes swell in service, this not only reduces the effective life of the electrode but can also have detrimental effects on the other electrode with which it is combined in use.

When an electrode which is subject to swelling in service is assembled in a cell compartment with an electrode according to the present invention with separator means therebetween, the grid structure can serve to limit swelling of the first-mentioned electrode and to control the pressure exerted on the active material of the electrode according to the present invention.

In the case of a nickel/zinc secondary cell, for example, by arranging for the grid structure to project outwardly from the major surface of the substrate beyond the outer face of the zinc active material, for example, it is possible to arrange either that swelling of the nickel electrode has no compressive effect on the zinc active material, or that the nickel electrode is allowed to exercise a controlled compression of the zinc active material thereby alleviating any tendency for the latter to delaminate from the conductive support in service. Alternatively, where the nickel electrode is required to provide compression on the zinc active material to enhance adhesion of the latter to the conductive support throughout its working life, the grid structure may terminate flush with the outer face of the zinc active material and the configuration of the grid structure arranged such that any swelling of the nickel electrode in service will not result in undue pressure being exerted on the zinc active material. In either case, however, it will be appreciated that the grid structure limits expansion of the nickel electrode.

In the case where the other electrode of the cell is one which does not expand significantly in service, for example a sintered nickel electrode, it is particularly preferred for the grid structure of the subject electrode to extend only to said outer face of the active material, otherwise there is a risk of the active material of the subject electrode losing contact with its conductive support.

In a preferred construction, the grid structure is of unitary construction and conveniently is formed of a suitable plastics material, such as glass-filled poly (2,6-dimethyl) phenylene oxide. Conveniently, the grid structure is such that there are at least 9 and preferably 15 or more separate areas of the active material in a typical electrode of rectangular form.

Also according to the present invention, there is provided a method of manufacturing a secondary zinc electrode for a secondary electro-chemical cell, comprising the steps of pressing active zinc material against at least one major surface of an electrically conductive support so that the pressed active material presents an outer face which is spaced outwardly of said major surface, and providing a grid structure which separates the active material on the support into a plurality of physically separate areas.

Conveniently, the grid structure is pressed into the active material when the latter has been pressed onto the support, the pressing of the grid structure serving to separate the active material on the support into said plurality of physically separate areas. It is therefore preferred for the grid structure to be provided with a knife edge configuration over the portion thereof which is urged into the active material and which, in the completed electrode, abuts against the support. Such a knife edge configuration assists in a clean division of the active material into the separate areas and reduces the risk of active material being trapped between the support and the grid structure.

After pressing of the grid structure into the active material, a suitable separator material is applied in the usual way.

Expansion of the separate areas of active material in the electrode according to the present invention is possible without causing problems when the grid structure projects outwardly of the outer surface of the active material. Thus, with such an arrangement in a nickel/zinc electrode system, advantageous expansion of the zinc active material is permitted in service whereas expansion of the nickel electrode is prevented by the provision of the grid structure as mentioned above.

Figure 1:
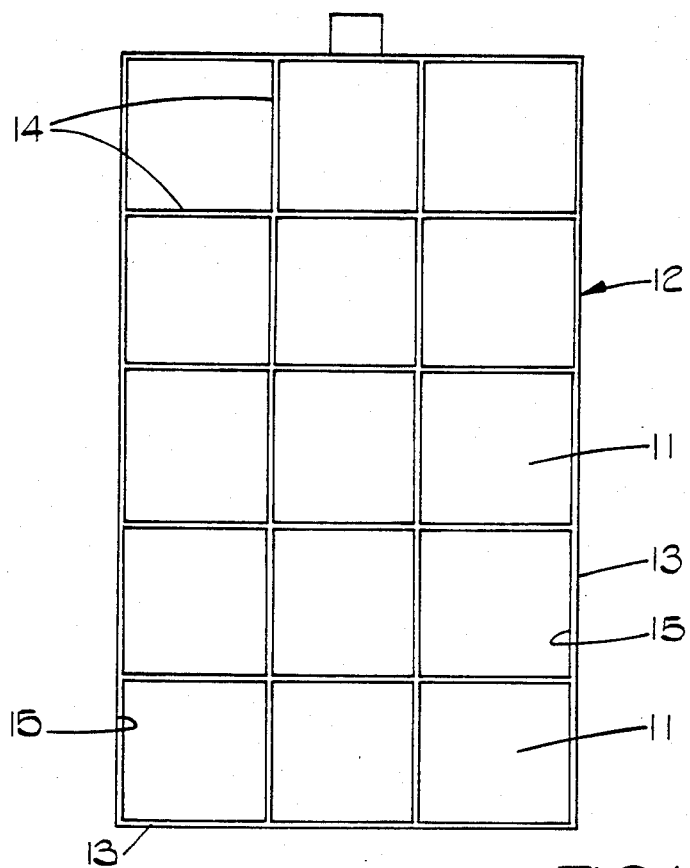
FIG. 1 is a plan view of a secondary electrode according to one embodiment of the present invention.
Figure 2:
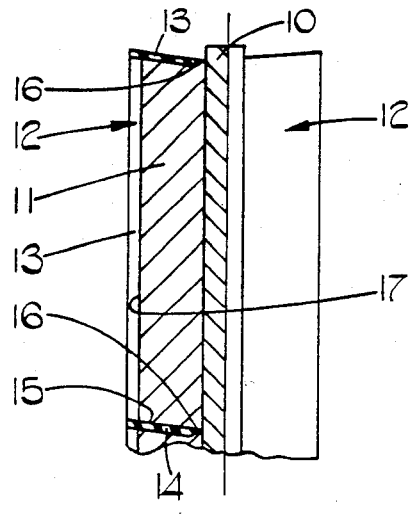
FIG. 2 is a part sectional view through a portion of the electrode of FIG. 1 (not to scale)

Referring now to FIGS. 1 and 2 of the drawings, the electrode illustrated therein is a secondary zinc electrode for use in a secondary electro-chemical cell in conjunction with one or more nickel electrodes and an alkaline electrolyte. The zinc electrode comprises a current collector foil 10 having a layer 11 of active zinc material pressed onto each of the two major surfaces thereof. The foil 10 provides an electrically conductive support for the layers 11 of active material. In accordance with the invention, the electrode further comprises a respective moulded plastics grid structure 12 which is pressed into the surface of each layer 11. Each grid structure 12 has peripheral walls 13 and intermediate walls 14 integrally moulded so as to define a multiplicity of separate compartments 15. The walls 13 and 14 are profiled so as to define knife edges 16 to facilitate pressing of the grid structure 12 into the layer 11. As can be seen from FIG. 2, the inner edges 16 abut against the respective major surface of the current collector foil 10 so that each layer 11 of active material is separated into a plurality of physically separate areas, each of which is disposed in a respective one of the compartments 15. As can also be seen from FIG. 2, the walls 13 and 14 of the grid structure 12 project outwardly from the respective major surface of the current collector foil 10 beyond the exposed outer face 17 of the active material. The walls 13 and 14 are inclined at a small angle (in this embodiment 15°) to the horizontal (as viewed in FIG. 2) to allow for gas escape in use.

To complete the electrode, the assembly of foil 10 layers 11 and grid structures 12 are wrapped in the conventional way with an absorber material and then by layers of a main separator material.

To demonstrate the advantages of the present invention, examples of specific secondary zinc electrodes will be described hereinafter.

EXAMPLE 1

A zinc electrode of the construction described hereinabove with reference to FIGS. 1 and 2 was 150 mm long and 90 mm wide. The layers 11 of active material were 1 mm thick and formed of 81% by weight zinc oxide, 16% by weight graphite, 2% by weight polytetrafluoroethylene and 1% by weight of mecuric oxide, as described in European Patent application Publication No. 0021735. The grid structure 12 was formed of glass filled nylon (although glass filled NORYL(GP3) can be used). The walls 13 and 14 had a thickness of 0.75 mm and a depth of 1.6 mm and were arranged so as to define 15 separate compartments 15 having an approximate size of 30 mm$^2$. The absorber employed was a single layer of a non-woven polyamide material sold by Carl Freudenberg as VILEDON FT 2119 whilst the main separator was constituted by three layers of micro porous polypropylene as supplied by Celanese Limited (USA) as CELGARD 3401. In order to test the resistance of the above described electrode to shape change, a pair of cells were constructed, one of which contained the above described zinc electrode and the other contained an identical electrode but without the grid structures 12. Each cell had the zinc electrode centrally mounted and four outer sintered nickel electrodes each having a capacity of about 12 ampere hours. The theoretical capacity of the zinc electrode was 25 ampere hours. The electrolyte consisted of an aqueous solution containing 30% potassium hydroxide, 1% lithium oxide and 8% by weight of zinc oxide as a stabilizer against dissolution of the zinc anode.

Figure 5:
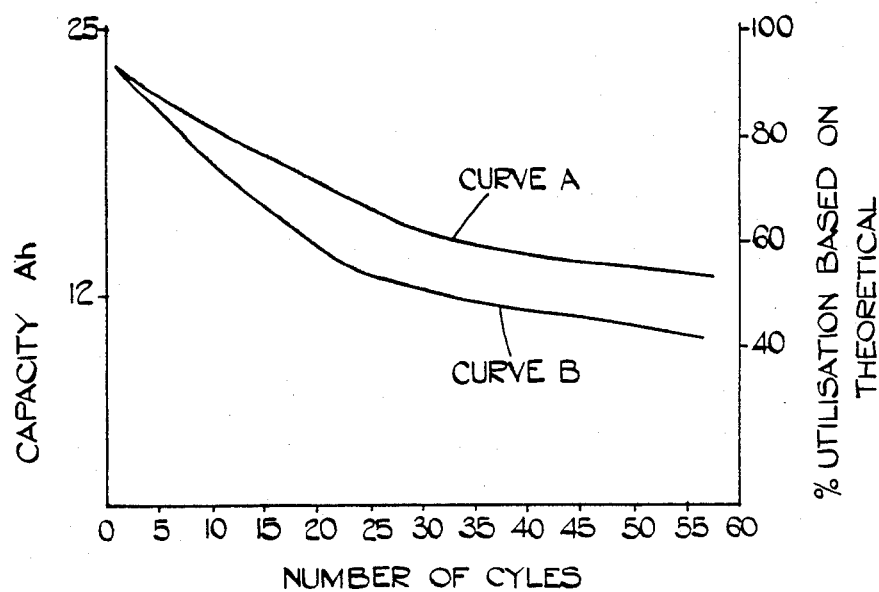
FIG. 5 is a graph showing the comparison in performance between elctrodes with and without the grid structure.

Each cell was subjected to a charging/discharging cycling regime consisting of a 10 hour charge at 2.5 amps followed by a discharge at 5 amps down to 0 volts. The results obtained by the zinc electrode with grid structure 12 according to the present invention are shown by curve A in FIG. 5 whilst the results obtained with the cell containing the electrode without the grid structure 12 are shown by curve B in FIG. 5. As can be seen, the fall off in capacity using an electrode according to the present invention is less marked than with the other electrode. It is important to note that the cycle life above 40% utilisation is significant. Curve B reaches 40% utilisation at approximately 60 cycles, whereas curve A will reach 40% utilisation at almost twice this. Also, it is to be borne in mind that the cycle lives in the graph of FIG. 5 are relatively low because they relate to measurements obtained using a fully charged/fully discharged (100% depth of discharge) cycling regime. In practice, electrodes Zn/ZnO are invariably operated with excess ZnO. At maximum, they are charged only about 40% giving a ZnO/Zn ratio of 2.5 when fully charged. Under such conditions, the cycle lives will be much longer. However, by definition, it is not possible to plot the deteriorating performance against cycle life. Therefore, the cycle life is only known when the electrode is no longer able to accept 40% charge. The shape change pattern discussed above is also different. In the electrode without the grid structure, normal shape change is observed with movement from the top and edges to the bottom and middle of the electrode. In the electrode according to the present invention, this movement is much less severe, but it is, however, accompanied by a shape change within the individual compartments 15, with movement within the compartments 15 being towards the centre of the electrode.

EXAMPLE 2

In order to investigate shape change improvements in the above described electrode, two cells were constructed, each consisting of two outer zinc electrodes as described in Example 1 above and a pressed nickel electrode as described in published GB No. 2060214A. In one of the cells, each zinc electrode included the grid structure 12 in accordance with the invention and in the other cell (the reference cell) each zinc electrode was of the same construction and composition but without the grid structure 12. The dimensions of each zinc electrode were the same as described in Example 1. The nickel electrode had a nominal capacity (C) of 8 ampere hours. Each cell was cycled on a charge/discharge regime consisting of a $\frac{1}{3} \times C$ charge for 5 hours (2.66 amps) and a $\frac{1}{3} \times C$ discharge to 0 volts (for the nickel electrode against a Hg/HgO reference electrode) for 20 cycles. The reference cell was nickel limiting with a utilisation of 70% (5.6 ampere hours). With the cell containing the zinc electrodes with grid structures, the average utilisation of the nickel electrode was 110% (8.8 ampere hours).

After 45 cycles on the above charge/discharge regime, the reference cell was dismantled and the zinc electrodes thereof examined and measured for shape change. The resuls are shown in FIG. 3.

After 50 cycles on the above charge/discharge regime, the cell containing the electrodes according to the present invention was dismantled and the zinc electrodes were examined for shape change. The results obtained are shown in FIG. 4.

Figure 3:
FIG. 3 illustrates the shape change exhibited by a secondary zinc electrode without barrier mens.
Figure 4:
FIG. 4 illustrates the shape change exhibited by the secondary zinc electrode provided with a grid structure according to the present invention.

Referring now to FIGS. 3 and 4, shape change was examined by dividing each electrode into nine equal segments and measuring the amount of zinc in each segment. The figures given in FIGS. 3 and 4 show the amount of zinc expressed as a percentage of average segment weight after cycling. As can be seen, the electrode of the present invention exhibits considerably less shape change than the reference electrode in spite of the fact that the reference electrode itself shows considerably less shape change than a more conventional electrode where no graphite is present in the active material.

Although in the embodiment described above, the grid structure provides a series of square compartments, it is to be appreciated that any desired shape and size of compartments is possible provided that the individual compartments are separate so that the individual regions of active material therein are mutually separated.

The projection of the grid structure beyond the outer surface of the active material is particularly advantageous when the zinc electrode is used in a secondary cell containing one or more pressed nickel electrodes. This is because, in such a cell, a combination of gas evolution and changes in the density of the active nickel material on charging develops strong expansive forces (in the region of 10 to 100 psi—69 to 690 kPa). If, as a result of these forces, significant expansion of the nickel electrode takes place, then there will be a sharp fall in the conductivity of the electrode (provided by a graphite matrix in the nickel electrode), and the utilisation of the active material, and the efficiency and life of the electrode will drop sharply. On the other hand, the zinc electrode operates better with a fairly high porosity (greater than 50%) and expansive pressures generated during charging of this electrode are low (of the order of 1 to 4 psi—6.9 to 27.6 kPa). Thus, the provision of the grid structure fulfills the dual function of preventing the nickel electrode from expanding whilst maintaining the high porosity in the zinc electrode by ensuring that it is free to expand outwardly.

However, it will be appreciated that it is not essential for the grid structure to project outwardly from the major surface of the substrate beyond the outer face of the active material in order to obtain the shape change improvement for the electrode. In fact, it can be arranged that the grid structure, whilst limiting swelling of the nickel electrode, allows such swelling to cause controlled compression of the zinc active material within the compartments either throughout all, or the latter part of, the life of the cell so as to assist in maintaining adhesion of the zinc active material to the substrate. What is important is that the grid structure prevents physical contact between the active material in adjacent areas although it will be appreciated that electrical contact is effected by way of the conductive support substrate. Hence the grid structure need not be constructed from electrically non-conducting material as in the example given, but may be constructed of electrically conductive material although the weight thereof could prove to be disadvantageous.

We claim:

1. A secondary zinc electrode for a secondary electro-chemical cell, comprising an electrically conductive support, a pressed active zinc material containing an organic binder adhering to at least one major surface of the support and presenting an outer face which is spaced outwardly of said major surface, and an electrically non-conducting grid structure separating the active material on the support into a plurality of physically separate areas.

2. An electrode as claimed in claim 1, wherein the grid structure extends away from the major surface of the support to terminate at the outer face of the active material.

3. An electrode as claimed in claim 1, wherein the grid structure extends away from the major surface of the support to project beyond the outer face of the active material.

4. An electrode as claimed in claim 1 wherein the grid structure is shaped to define at least nine compartments in which the active material is disposed.

5. An electrode as claimed in claim 4, wherein the grid structure is shaped to define at least fifteen compartments.

6. An electrode as claimed in claim 1, wherein the grid structure has a knife edge configuration at a portion thereof which engages against the major surface of the support.

7. An electrode as claimed in claim 1, wherein the grid structure has walls and which are inclined with respect to a normal to the major surface of the support.

8. An electrode as claimed in claim 1, wherein the grid structure is formed of peripheral walls and intermediate walls integrally moulded together.

9. An electrode as claimed in claim 1, wherein the active zinc material has disposed therein carbon in an amount of 1 to 50% by weight and an organic binder in an amount of 0.5 to 10% by weight, based on the combined weight of metallic zinc and carbon.

* * * * *